United States Patent
Maiste et al.

[15] 3,664,348
[45] May 23, 1972

[54] STONE TRAP FOR A COMBINE

[72] Inventors: Arved Maiste; Melvin F. Robertson, both of Brantford, Ontario, Canada

[73] Assignee: White Motor Corporation of Canada Limited, Brantford, Ontario, Canada

[22] Filed: Feb. 25, 1971

[21] Appl. No.: 118,762

[30] Foreign Application Priority Data

Mar. 13, 1970 Canada...................................077,399

[52] U.S. Cl............................................................130/27 JT
[51] Int. Cl. ............................................................A01f 12/16
[58] Field of Search......................130/27 J, 27 JT, 27 S, 27 R

[56] References Cited

UNITED STATES PATENTS

3,209,760  10/1965  Claas..................................130/27 JT

FOREIGN PATENTS OR APPLICATIONS

467,475  1/1950  Canada................................130/27 JT

Primary Examiner—Antonio F. Guida
Attorney—Greist, Lockwood, Greenawalt & Dewey

[57] ABSTRACT

The stone trap is in the form of a trough having a front wall which extends below the delivery end of the feeder conveyor of a combine, a rear wall which extends below the entry edge portion of the concave of the combine, first and second side walls which are secured respectively to first and second frame members of the combine, and a trap door which extends across the bottom of the stone trap and in which is adapted to drop material caught in the stone trap into a portion of a grain pan of the combine which extends below the stone trap. To facilitate self-cleaning of the stone trap, the outlet width of the stone trap between the bottom edge of the front wall and the bottom edge of the rear wall is greater than the inlet width of the stone trap between the entry position of the concave and the top edge of the front wall.

10 Claims, 5 Drawing Figures

PATENTED MAY 23 1972 3,664,348
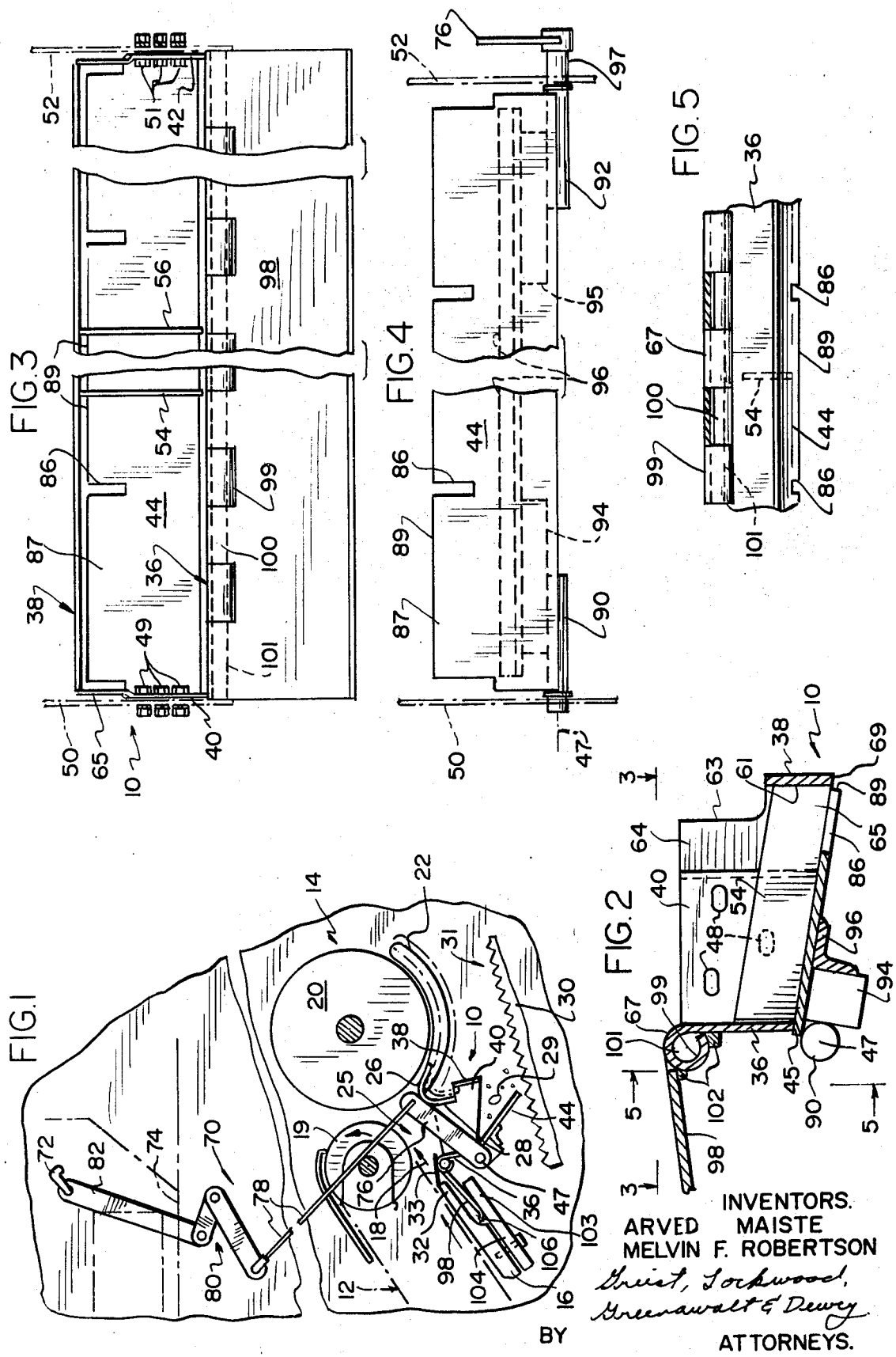
INVENTORS.
ARVED MAISTE
MELVIN F. ROBERTSON
BY Greist, Lockwood, Greenawalt & Dewey
ATTORNEYS.

STONE TRAP FOR A COMBINE

The present invention relates to a stone trap for a combine.

Stone traps for combines and threshing machines are well known in the prior art and typically have been mounted below the space between a feeder conveyor, which feeds material to a threshing mechanism, and the entry edge portion of the theshing concave of the threshing mechanism. Such stone traps are designed to catch stones or other foreign objects which may be mixed with the material, such as a cut crop, being fed by the feeder conveyor to the threshing mechanism and thereby prevent the stones or other foreign objects from damaging the threshing mechanism.

One known stone trap is in the form of a trough detachably mounted in front of the concave. Typically, this type of stone trap is slidably supported in front of the concave for easy removal from the side of the combine, i.e., it is in the form of a drawer. With this type of stone trap, it is necessary to stop the operation of the combine to empty the stone trap, since the operator has to dismount from the combine and remove the stone trap to empty the same. Moreover, if emptying of the stone trap is neglected and the stone trap becomes filled, succeeding stones fed toward the threshing mechanism by the feeder conveyor may very likely cause damage to the threshing mechanism.

Another stone trap which has been proposed is in the form of a spring biased plate which is pivotally mounted in front of the concave and which is adapted to pivot downwardly under the weight of a stone received thereon to drop the stone into a grain conveyor or bin. This type of stone trap required a predetermined setting of the spring tension acting on the plate. Moreover, stones propelled across the plate by the feeder conveyor may not necessarily have a sufficient downward force to cause deflection of the plate to drop the stone into the grain conveyor or bin. Thus, this type of stone trap was not always effective in protecting the threshing mechanism from damage by stones or other foreign objects.

To overcome some of these disadvantages incurred with known stone traps, the stone trap of the present invention includes a trough having an outlet which is larger than the inlet so that stones or other foreign matter which fall through the inlet into the stone trap will easily fall through the outlet of the stone trap when a trap door at the bottom of the stone trap is opened. Moreover, the stone trap includes an operating lever mounted at the operator's platform of the combine and connected by a linkage to the trap door so the trap door can be opened as often as required, during operation of the combine, to remove stones caught in the stone trap.

Preferably, the trap door of the stone trap is perforated to allow small particles of material, such as grain, to fall through the perforations into a grain pan positioned below the stone trap and thereby minimize loss of grain and also reduce the number of trap door openings for removing material collected in the stone trap.

Also, preferably the stone trap is fastened on either side thereof to frame members of the combine so that the stone trap serves as a reinforcing structural member of the combine in front of the threshing mechanism to minimize deflection of the frame members and the resulting loss of threshing efficiency caused by such deflection.

An important object of the present invention is to provide a stone trap which empties into the grain pan of a combine so that grain falling into the stone trap is retrieved through the cleaning system of the combine.

Another object of the present invention is to provide a stone trap having an outlet which is larger than the inlet so that stones or other foreign matter caught in the stone trap will easily fall through the stone trap.

Another object of the present invention is to provide a stone trap in the form of a trough which has a trap door at the bottom thereof and which is self-cleaning when the trap door is opened.

Another object of the present invention is to provide a stone trap in the form of a trough having a trap door at the bottom thereof which is perforated to allow small matter to fall through the perforations and thereby reduce the number of trap door openings for removing material caught in the stone trap.

Another object of the present invention is to provide a stone trap in the form of an elongated trough which is fastened on either end thereof to side frame members of the combine and in this way form a reinforcing structural member of the combine in front of the threshing cylinder of the combine to minimize the deflection of the frame members and the resulting loss of threshing efficiency.

These and other objects of the present invention including the manner of their attainment will become more apparent from the following detailed description of a preferred embodiment of the invention taken in conjunction with the accompanying drawings wherein:

FIG. 1 is a fragmentary side plan view of the stone trap of the present invention showing the mechanical linkage of the stone trap for opening a trap door at the bottom of the stone trap and showing the position of the stone trap between one end of a feeder conveyor of a combine and a threshing mechanism of the combine;

FIG. 2 is an enlarged fragmentary vertical sectional view of the stone trap shown in FIG. 1;

FIG. 3 is a fragmentary top plan view of the stone trap taken along line 3—3 of FIG. 2;

FIG. 4 is a fragmentary top plan view of the trap door shown in FIG. 3;

FIG. 5 is a fragmentary sectional view taken along line 5—5 of FIG. 2.

Referring now to the drawings in greater detail, the stone trap of the present invention is generally indicated at 10 in FIG. 1, and is shown positioned between a feeder conveyor 12 of a combine and a threshing mechanism 14 of the combine. A shelf or ramp 16 is positioned beneath the feeder conveyor 16, and material, such as a cut crop being harvested, is moved by the feeder conveyor 12 along the ramp 16 in a direction indicated by the arrow 18 toward the threshing mechanism 14. The threshing mechanism 14 is horizontally spaced from the upper or delivery end 19 of the conveyor 12 and includes a threshing cylinder 20 and a threshing concave 22.

It will be understood that the cut crop is thrown by the feeder conveyor 12 across a gap or space 25 between the conveyor 12 and the threshing mechanism 14, toward the threshing mechanism 14. The cut crop then enters the threshing mechanism 14 between the threshing cylinder 20 and an entry edge portion 26 of the concave 22. Also, it will be understood that when particles, which are heavier than the harvested crop, e.g., stones, are thrown by the feeder conveyor 12 toward the threshing mechanism 14, they will fall into the stone trap 10 and be caught therein.

Thus, lightweight material, such as a cut crop, is easily thrown across the space 25 to the threshing mechanism 14, and foreign matter, such as stones or sticks which are heavier than the cut crop, fall into the stone trap 10 or are deflected into the stone trap 10 upon hitting a depending flange 28 of the entry edge portion 26 of the concave 22. Moreover, the stone trap 10 is adapted to be opened to drop the foreign matter, such as the stones indicated at 29, into the forward end 30 of a grain pan 31 positioned below the stone trap 10 and are retrieved through the cleaning system (not shown) of the combine.

To facilitate the flow of material toward the threshing mechanism 14, the upper end 32 of the ramp 16 has a lip portion 33 which extends toward the threshing mechanism 14 in such a way that the lip portion 33 serves as a guide for guiding material being thrown from the ramp 16 toward the threshing mechanism 14.

Referring now to FIG. 2, the stone trap 10 is in the form of a trough and includes a front wall 36 extending below the delivery end 19 of the conveyor 12, a rear wall 38 extending below the concave 22, first and second side walls 40 and 42 (FIG. 3) and a trap door 44 pivotally mounted adjacent the lower edge 45 of the front wall 36 for pivotal movement about a pivot axis 47. As shown, the side wall 40 has three elongated apertures 48 adapted to receive bolts 49 (FIG. 3) or other fasteners for securing the side wall 40 to a first side frame member of the combine, generally indicated by phantom lines at 50 in FIG. 3. Although not shown in detail, it will be understood that the side wall 42 is essentially a mirror image of the side wall 40 and is secured by bolts or fasteners 51 to a second side frame member 52 of the combine, spaced from the first frame member 50. It will also be understood that the threshing mechanism 14 is mounted to and between the frame members 50 and 52.

With the side walls 40 and 42 of the stone trap 10 rigidly secured to the side frame members 50 and 52, the stone trap 10 serves as a rigidifying or reinforcing structural member of the combine which inhibits, if not altogether prevents, deflection of the side frame members 50 and 52 during operation of the combine and thereby improves the efficiency of the threshing mechanism 14.

To strengthen the stone trap 10, and thereby provide a stronger structural reinforcing member between the side frame members 50 and 52, the stone trap 10 includes two interior walls or reinforcing plates 54 and 56 (FIG. 3) which extend between and are secured to the front and rear walls 36 and 38 and which are parallel spaced from each other and from the side walls 40 and 42 at equidistant points along the length of the stone trap 10.

As best shown in FIG. 2, the front wall 36 has a greater height than the rear wall 38 so that a sufficient space is provided above the rear wall 38 between the upper edge 59 of the rear wall 38 and the threshing cylinder 20, to allow for vertical and horizontal movement of the concave 22 during adjustment of the concave 22 relative to the cylinder 20. In this respect, it will be noted that the depending flange 28 of the entry edge portion 26 of the threshing concave 22 cooperates with the rear wall 38 to hold stones and other material falling into the stone trap 10 within the stone trap 10. Moreover, the entry edge portion 26 is movable in the space above the rear wall 38 and inwardly of the stone trap 10 between an interior surface 61 of the rear wall 38 and a rearwardly facing generally vertical edge portion 63 of each of the side walls 40 and 42. It will be noted that a rearwardly extending portion 64 of each of the side walls 40 and 42 is formed with a step portion 65 between which the rear wall 38 extends, and the edge portion 63 extends upwardly from the step portion 65 inwardly of the rear wall 38.

From the foregoing description, it will be readily understood that the open inlet of the stone trap 10 below the space 25 is defined by the side walls 40 and 42, the front wall 36 and the depending flange 28, and the inlet width between a top edge 67 of the front wall 36 and the depending flange 28 of the entry edge portion 26 of the concave will vary depending upon the position of the concave 22. Moreover, since the depending flange 28 is located inwardly of the rear wall 38, the outlet width of the stone trap 10 between the lower edge 45 of the front wall 36 and a lower edge 69 of the rear wall 38 will always be greater than the inlet width such that the outlet defined by the side walls 40 and 42 and the front and rear walls 36 and 38 is larger than the inlet. In this respect, the stone trap 10 can be considered as having a generally trapezoidal shape with the trapezoid being defined by the lower edge 45 of the front wall 36, the upper edge 67 of the front wall 36, a point on the depending flange 28 horizontally spaced from the upper edge 67 of the front wall 36, and the lower edge 69 of the rear wall 38. This trapezoidal shaping of the stone trap 10, by which the stone trap 10 has an outlet larger than the inlet, provides the stone trap 10 with a self-cleaning feature whereby material falling through the inlet will easily fall through the larger outlet when the trap door 44 is opened.

As shown in FIG. 1, the stone trap 10 includes a linkage mechanism 70 connected between the trap door 44 and an operating lever 72 mounted on one side of an operator's platform generally indicated by broken lines at 74. The linkage mechanism 70 includes an arm 76, a connecting rod 78 and a bellcrank mechanism 80. The arm 76 is connected between the trap door 44 and the connecting rod 78 and extends radially outwardly from the pivot axis 47 of the trap door 44. The connecting rod 78 extends between the arm 76 and the bellcrank mechanism 80, and the operating lever 72 is connected to one end 82 of the bellcrank mechanism 80. By having the operating lever 72 located on one side of the operator's platform 74, an operator can easily open the trap door 44 at any time during the operation of the combine to drop material collected in the stone trap 10 into the grain pan 31. In this way, grain caught in the stone trap 10 will be saved when the stones are dropped into the grain pan 31 and the stones will be removed by the cleaning system (not shown) of the combine.

As best shown in FIGS. 3 and 4, the trap door 44 has perforations or slots 86 in a rear margin 87 of the trap door 44 whereby small particles of material, such as grain, falling into the stone trap 10 can fall through the perforations 86 into the grain pan 31. In the illustrated embodiment (FIGS. 2, 3 and 4), the perforations 86 extend to a rear edge 89 of the trap door 44, and as shown in FIGS. 1, 2 and 5, the bottom of the stone trap 10 defined by the trap door 44 is arranged to slant downwardly and rearwardly toward the lower edge 69 of the rear wall 36 so that most of the grain, falling through the space 25 into the stone trap 10, will flow inwardly and downwardly of the stone trap 10 toward the rear edge 89 of the trap door 44 and then fall through the perforations 86 into the grain pan 31.

As best shown in FIG. 4, the trap door 44 is pivotally mounted to the side frame members 50 and 52 by means of first and second pins 90 and 92. As shown, the pins 90 and 92 are each secured to a trap door supporting structure 94 and 95, which, in turn, are secured to an angle brace 96 extending the length of the trap door 44 and secured to the trap door 44 for supporting the same. As shown, the arm 76 is secured to a laterally extending portion 97 of the pin 92.

As shown in FIG. 1, the stone trap 10 includes a plate 9 which extends from the front wall 36 along a substantial portion of the length of the stone trap 10 and which is supported by a portion of the combine below the ramp 16. The plate 98 enables the stone trap 10 to be supported along its length by the combine. Also the plate 98 facilitates the mounting of the stone trap 10 in the combine and the proper positioning of the stone trap 10 prior to the fastening of the side walls 40 and 42 to the side frame members 50 and 52.

As best shown in FIG. 3, the plate 98 is hingedly connected to the front wall 36 by means of spaced apart pintle formations 99 extending from the upper edge 67 of the front wall 36, pintle formations 100 extending from the plate 98 and received between the pintle formations 99, and a pin 101 which extends through the pintle formations 99 and 100 to form a piano hinge connection between the plate 98 and the front wall 36. As shown in FIG. 2, the piano hinge connection is sealed on the underside thereof by strip seals 102 secured respectively to the front wall 36 and the plate 98 adjacent the pintle formations 99 and 100.

Referring back to FIG. 1, the upper end portion 32 of the ramp 16 has a reduced thickness, and a portion 103 of a supporting bar 104, secured to the ramp 16, extends below the end portion 32 of the ramp 16 to form a space 106 between the end portion 32 and the portion 103 for receiving and holding the plate 98. It will be understood, that when mounting the stone trap 10 in the combine, the plate 98 is inserted in the space 106 whereby the stone trap 10 is hingedly supported along the length thereof while the side walls 40 and 42 of the stone trap are fastened by the fasteners 49 and 51 to the side frame members 50 and 52 of the combine.

From the foregoing description, it will be understood that the present invention has numerous advantages, some of which have been described above and others which are inherent in the invention. Accordingly, the scope of the present invention is only to be limited as necessitated by the appended claims.

I claim:

1. A stone trap for a combine of the type comprising a threshing mechanism including a threshing cylinder mounted between first and second frame members and a threshing concave positioned below said threshing cylinder and having an entry edge portion, a feeder conveyor for delivering material to a point spaced from said threshing mechanism where said material is thrown, by the momentum imparted to same by said conveyor, across the space between said conveyor and said threshing mechanism toward said entry edge portion of said concave, and a grain pan arranged below said concave and having a portion thereof which extends below said stone trap, said stone trap being in the form of a trough positioned below said space between said conveyor and said threshing mechanism and having a front wall which extends below said material delivery point, a rear wall which extends below said entry edge portion of said concave, first and second side walls, and a movable trap door which extends across at least a portion of the bottom of said stone trap, whereby said stone trap is open at the top and normally closed at the bottom, and said trap door being adapted to be opened during operation of said threshing mechanism to drop material caught in said stone trap into said grain pan.

2. A stone trap as defined in claim 1 wherein said stone trap has an outlet width between the bottom edge of said front wall and the bottom edge of said rear wall which is greater than the inlet width of said stone trap between said entry edge portion of said concave and the top edge of said front wall whereby stones falling into said stone trap can easily fall from said stone trap when said trap door is opened.

3. A stone trap as defined in claim 1 including an operating lever and a mechanical linkage having a first end connected to said operating lever and a second end connected to said trap door, said operating lever being situated on one side of an operator's platform on said combine whereby said trap door can be easily opened during operation of said combine.

4. A stone trap as defined in claim 1 wherein said trap door has a front edge below the bottom edge of said front wall and a rear edge below the bottom edge of said rear wall, and is pivotally mounted for pivotal movement about an axis adjacent said front edge.

5. A stone trap as defined in claim 1 wherein said trap door has perforations therein to allow small pieces of material falling in said stone trap during operation of said combine to fall through said perforations into said grain pan without opening said trap door.

6. A stone trap as defined in claim 1 wherein said first and second side walls are secured respectively to said first and second frame members of said combine whereby said stone trap serves as structural reinforcing member of said combine to minimize deflection of said frame members.

7. The stone trap as defined in claim 1 including at least one reinforcing wall spaced from and generally parallel to said side walls and extending between said front and rear walls of said stone trap.

8. A stone trap as defined in claim 1 wherein said trap door inclines downwardly from the bottom edge of said front wall to the bottom edge of said rear wall and has perforations in the marginal portion thereof which extends along and adjacent said bottom edge of said rear wall whereby small particles of material falling into said stone trap will flow or slide rearwardly and downwardly toward said rear wall of said stone trap and fall through said perforations into said grain pan.

9. A stone trap as defined in claim 1 wherein said front wall has means extending outwardly therefrom along a substantial portion of the length of said stone trap for engaging and being supported by a portion of said combine along said length of said stone trap.

10. A stone trap for a combine of the type comprising a threshing mechanism including a threshing cylinder mounted between first and second frame members and an adjustable theshing concave positioned below said threshing cylinder and having an entry edge portion, a feeder conveyor for delivering material to a point spaced from said threshing mechanism where said material is thrown, by the momentum imparted to same by said conveyor, across the space between said conveyor and said threshing mechanism toward said entry edge portion of said concave, and a grain pan arranged below said concave and having a portion thereof which extends below said stone trap, said stone trap being in the form of a trough positioned below said space between said conveyor and said threshing mechanism and having a front wall which extends below said material delivery point, a rear wall which extends below said entry edge portion of said concave, first and second side walls, and a movable trap door which extends across at least a portion of the bottom of said stone trap, whereby said stone trap is open at the top and normally closed at the bottom, said trap door being adapted to be opened during operation of said threshing mechanism to drop material caught in said stone trap into said grain pan, and said rear wall having a height less than the height of said front wall whereby the top edge of said rear wall is spaced a predetermined distance beneath said threshing cylinder to provide a sufficient space for vertical and horizontal movement of said entry edge portion of said concave during adjustment of the position of said concave relative to said threshing cylinder and of the position of said entry edge portion relative to the top edge of said front wall for adjusting the size of said top opening of said stone trap.

* * * * *